United States Patent
Okada

(10) Patent No.: US 7,689,059 B2
(45) Date of Patent: Mar. 30, 2010

(54) IMAGE PROCESSING METHOD AND IMAGE PROCESSING CIRCUIT

(75) Inventor: Kazuhiko Okada, Kasugai (JP)

(73) Assignee: Fujitsu Microelectronics Limited, Yokohama (JP)

( * ) Notice: Subject to any disclaimer, the term of this patent is extended or adjusted under 35 U.S.C. 154(b) by 855 days.

(21) Appl. No.: 11/526,050

(22) Filed: Sep. 25, 2006

(65) Prior Publication Data

US 2007/0253636 A1 Nov. 1, 2007

(30) Foreign Application Priority Data

Apr. 27, 2006 (JP) .............................. 2006-124094

(51) Int. Cl.
*G06K 9/40* (2006.01)

(52) U.S. Cl. ...................................... 382/274; 382/264

(58) Field of Classification Search ................. 382/274, 382/275, 254, 263, 264; 358/463
See application file for complete search history.

(56) References Cited

U.S. PATENT DOCUMENTS 6,724,942 B1 * 4/2004 Arai ........................... 382/254
7,164,805 B2 * 1/2007 Takahira ..................... 382/263

FOREIGN PATENT DOCUMENTS

JP 7-67038 A 3/1995

* cited by examiner

*Primary Examiner*—Yon Couso
(74) *Attorney, Agent, or Firm*—Fujitsu Patent Center

(57) ABSTRACT

A method and circuit for suppressing the generation of unnatural vertical streaks in output image data. A detection processing circuit generates a first noise correction value based on first and second noise detection signals from an OB region. A correction processing circuit performs an offset process on a first noise correction value to generate a second noise correction value and performs an FIR filter process on the second noise correction value to generate a noise correction signal NC. The correction processing circuit then corrects the effective image signal from the effective image region using the noise correction signal and performs a horizontal LPF process on the corrected effective image signal to generate output image data.

20 Claims, 4 Drawing Sheets

IMAGE PROCESSING METHOD AND IMAGE PROCESSING CIRCUIT

CROSS-REFERENCE TO RELATED APPLICATIONS

This application is based upon and claims the benefit of priority from the prior Japanese Patent Application No. 2006-124094, filed on Apr. 27, 2006, the entire contents of which are incorporated herein by reference.

BACKGROUND OF THE INVENTION

The present invention relates to an image processing method and image processing circuit, and more particularly, to noise correction of image data in a solid state imaging device.

In the prior art, solid state imaging devices use solid state imaging elements such as charge couple device (CCD) image sensors and CMOS image sensors. Since the image data generated by solid state imaging devices may include defects such as vertical streaks due to the structure of the solid state imaging devices, it is required that such defects be reduced.

In solid state imaging devices that use CCD image sensors, a phenomenon unique to CCD image sensors occur in which a smear is produced when intense light enters the device. The smear reduces image quality. The smear occurs when charges that cannot be held in a charge accumulation region override a potential region and leak into a vertical transfer channel. When the charge leakage is caused by normal and stable light, a smear is produced during the entire vertical transfer period. Therefore, when there are light spots, for example, streaks are produced in the vertical direction.

Japanese Laid-Open Patent Publication No. 7-67038 describes a method for suppressing the smear phenomenon by making use of the smear generation principle in which a smear is produced at substantially the same level in the vertical direction. In this method, the output level of the image sensor in a vertical optical black region, which is shielded from light, is set as a reference, and the reference value is subtracted from a pixel value of an effective pixel region. More specifically, the image sensor is divided into an effective pixel region, which receives light, and an optical black region, which is shielded from light. A vertical optical black region is set as a black reference for the column direction from the optical black region, and the vertical optical black region is used as a smear detection region.

FIG. 1 is a schematic block diagram of an image processing circuit in the prior art. An image signal S from a CCD image sensor (solid state imaging element) is provided to a selection circuit 50. The selection circuit 50 divides the imaging signal S into an effective imaging signal $S_E$, which is output from an effective pixel region, and a noise detection signal $S_D$, which is output from the vertical optical black region. The selection circuit 50 provides the effective imaging signal $S_E$ to a calculator 51 and the noise detection signal $S_D$ to an integration circuit 52. The integration circuit 52 eliminates random noise from the noise detection signal $S_D$ through vertical integration (addition averaging) and stores the noise-eliminated signal $S_D$ in a line memory 53, which has a horizontal single-line segment capacity. The noise detection signal $S_D$ stored in the line memory 53 is provided to a low pass filter (LPF) processor 54. The LPF processor 54 eliminates noise components from the noise detection signal $S_D$ and provides the LPF-processed noise detection signal $S_D$ to the calculator 51. The calculator 51 subtracts the LPF-processed noise detection signal $S_D$ from the effective imaging signal $S_E$ of each horizontal line. In this manner, smear-corrected output image data is obtained.

SUMMARY OF THE INVENTION

There is a limit to the output level of an image sensor used in an imaging device. Therefore, when the imaging device receives intense light that exceeds this output level, the above smear correction may rather reduce the image quality. That is, when the output level is saturated in the smear area, the output level of the effective imaging signal $S_E$ attains a maximum value, and the output level of the noise detection signal $S_D$ corresponding to the effective imaging signal $S_E$ also attains the same value. As a result, the smear-corrected output (effective imaging signal $S_E$ minus the noise detection signal SD) becomes lower than the level obtained when there is no smear. This produces unnatural and dark vertical streaks subsequent to the smear correction.

Imaging devices using a CMOS image sensor, and particularly, a column reading type CMOS image sensor have variances in the input/output characteristics of amplifiers, which are arranged in each column. This is due to variations resulting from the manufacturing process of the amplifiers. Therefore, fixed pattern noise (vertical streak noise) having vertical streaks in an output image is generated. This results in the formation of an unnatural image.

The present invention provides an image processing method and image processing circuit for suppressing the generation of unnatural vertical streaks.

One aspect of the present invention is a method for performing noise correction using a pixel having a predetermined pixel value and arranged in an imaging region and a pixel having a predetermined pixel value and arranged in a non-imaging region. The method includes generating a first noise correction value based on the pixel value of the non-imaging region, determining a sign of the first noise correction value, generating a second noise correction value by subtracting a predetermined subtraction value from the first noise correction value when the sign of the first noise correction value is positive, generating the second noise correction value by adding a predetermined addition value to the first noise correction value when the sign of the first noise correction value is negative, and correcting the pixel value of the imaging region based on the second noise correction value.

A further aspect of the present invention is an image processing circuit for connection to a solid state imaging device including an imaging region and a non-imaging region. The imaging region and the non-imaging region each include a pixel having a predetermined pixel value. The image processing circuit including a detection processing circuit, connected to the solid state imaging device, for generating a first noise correction value based on the pixel value of the non-imaging region. A correction processing circuit, connected to the solid state imaging device and the detection processing circuit, receives the first noise correction value and corrects the pixel value of the imaging region. The correction processing circuit includes an offset processor, connected to the detection processing circuit, for determining a sign of the first noise correction value, for generating a second noise correction value by subtracting a predetermined subtraction value from the first noise correction value when the sign of the first noise correction value is positive and for generating the second noise correction value by adding a predetermined addition value to the first noise correction value when the sign of the first noise correction value is negative. A calculator, connected to the solid state imaging device and the offset processor, corrects the pixel value of the imaging region based on the second noise correction value.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
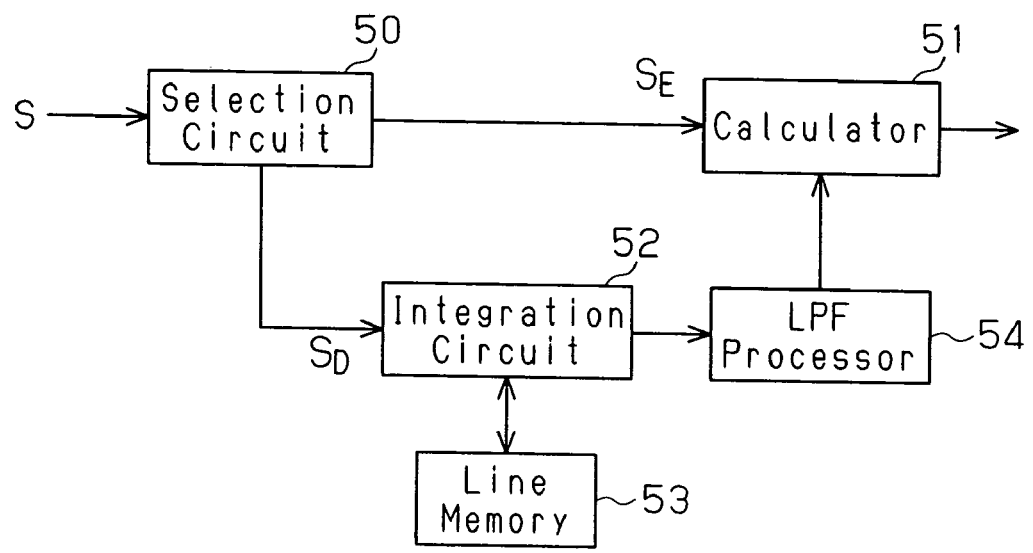
FIG. 1 is a schematic block diagram of an image processing circuit in the prior art.

In the drawings, like numerals are used for like elements throughout.

Figure 2:
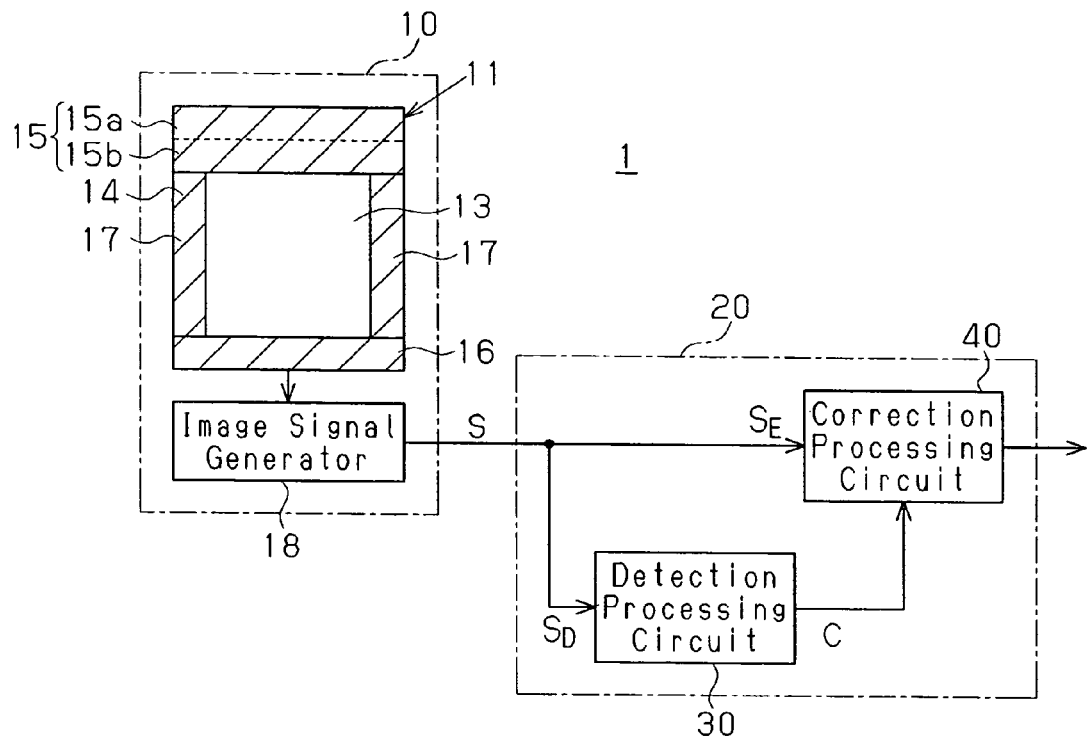
FIG. 2 is a schematic block diagram of a solid state imaging device including an image processing circuit according to a preferred embodiment of the present invention.

An image processing circuit 20 according to a preferred embodiment of the present invention will now be described with reference to FIGS. 2 through 5. FIG. 2 is a schematic block diagram of a solid state imaging device 1 including the image processing circuit 20.

As shown in FIG. 2, the solid state imaging element 10 of the solid state imaging device is formed by a CCD image sensor and includes an image sensor unit 11. The image sensor unit 11 includes a matrix of pixels for converting the received light to electrical signals. Further, the image sensor unit 11 includes an effective pixel region 13, which functions as an imaging region for receiving incidence light, and an optical black (OB) region 14, which functions as a non-imaging region formed by covering the pixels circumscribing the effective pixel region 13 with a light-shielding film of aluminum (Al) or the like. The optical black region 14 includes a first vertical OB region 15 formed above the effective pixel region 13, a second vertical OB region 16 formed below the effective pixel region 13, and horizontal OB regions 17 respectively formed on the right and left sides of the effective pixel region 13 as viewed in FIG. 2. The first and second vertical OB regions 15 and 16 are set as a black reference for the column direction, and the horizontal OB regions 17 are set as a black reference for the line direction. Furthermore, the first vertical OB region 15 is used as a noise detection region and is divided into a pixel average value detection region 15a and a column average value detection region 15b.

Figure 3:
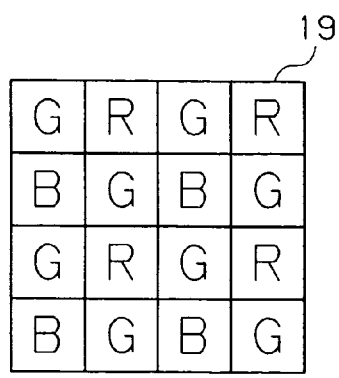
FIG. 3 is a schematic plan view showing a color filter array formed on an image sensor of FIG. 2.

FIG. 3 is a schematic plan view showing the array for a color filter 19 formed on the image sensor unit 11 of FIG. 2. As shown in FIG. 3, the color filter 19, which includes color filter components (red (R), green (G), and blue (B)), is formed on the entire surface of the image sensor unit 11 in a Bayer array. Each pixel of the image sensor unit 11 converts the light that passes through the corresponding color filter to an electrical signal.

The solid state imaging element 10 includes an image signal generator 18 as shown in FIG. 2. The image signal generator 18 receives an electrical signal from the image sensor unit 11, amplifies the electrical signal, generates an image signal, and provides the generated image signal S to the image processing circuit 20.

The image processing circuit 20 is provided with a detection processing circuit 30 and correction processing circuit 40, which are provided with the image signal S. The image signal S includes an effective image signal $S_E$ output from the effective pixel region 13 and a noise detection signal $S_D$ output from the first vertical optical black region 15. In accordance with the data reading position or data reading sequence, the effective image signal $S_E$ is provided to the correction processing circuit 40, and the noise detection signal $S_D$ is provided to the detection processing circuit 30. Then, the detection processing circuit 30 generates a correction value C, which is based on the noise detection signal $S_D$, and provides the correction value C to the correction processing circuit 40. The correction processing circuit 40 performs a correction process on the correction value C and generates a noise correction signal NC (refer to FIG. 5). Noise correction is then performed by subtracting the noise correction signal NC from the effective image signal SE. The correction processing circuit 40 provides the noise-corrected image signal to a display device such as a display or the like.

The image processing circuit 20 of the preferred embodiment may also be connected to a solid state imaging element (not shown) formed by a CMOS image sensor instead of the solid state imaging element 10 formed by the above CCD image sensor. A solid state imaging element formed by a CMOS image sensor is configured in the same manner as the solid state imaging sensor formed by a CCD imaging sensor and generates an image signal including an effective image signal output from the effective pixel region and a noise detection signal output from the optical black region. In such a case, the image processing circuit 20 would perform the same processes as described above with regard to the image signal provided from the solid state imaging element, which is formed by the CMOS image sensor, to generate a noise-corrected image signal.

Figure 4:
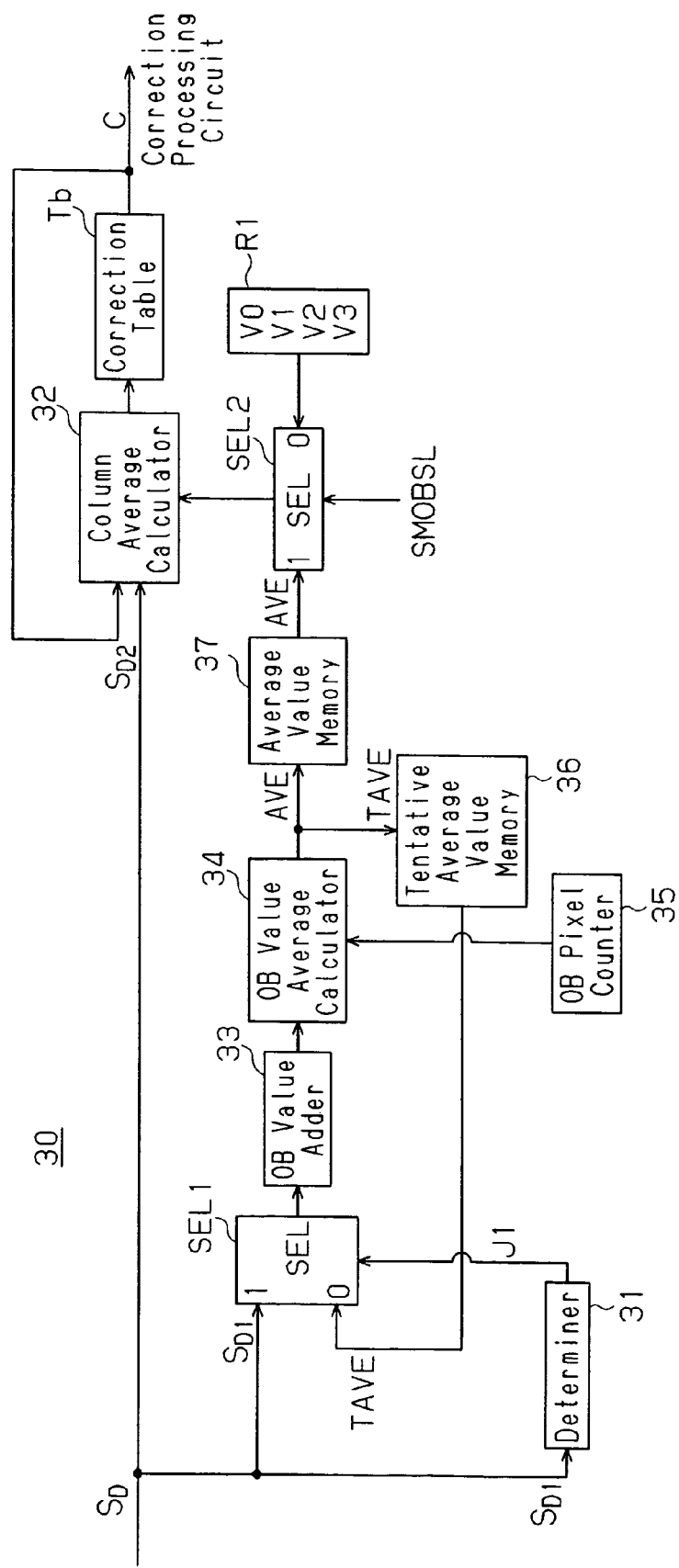
FIG. 4 is a schematic block diagram of a detection processing circuit of FIG. 2.

The detection processing circuit 30 will now be discussed with reference to FIG. 4.

The noise detection signal SD is provided via the image signal generator 18 from the first vertical OB region 15 to a determiner 31, a selector (fourth selection circuit) SEL1, and a column average calculator 32 in the detection processing circuit 30. More specifically, a first noise detection signal $S_{D1}$ is provided from the pixel average value detection region 15a to the determiner 31 and selector SEL1. A second noise detection signal $S_{D2}$ is provided from the column average value detection region 15b to the column average calculator 32.

The determiner 31 determines that a first noise detection signal $S_{D1}$ greater than a predetermined upper limit value or less than a predetermined lower limit value is a signal output from a defective pixel. In such a case, the determiner 31 provides the selector SEL1 with a determination signal J1 having an L level. The determiner 31 determines that a first noise detection signal $S_{D1}$ between the upper and lower limit values is a signal output from a normal pixel. In such a case, the determiner 31 provides the selector SEL1 with a determination signal J1 having an H level. In response to the H level determination signal J1, the selector SEL1 provides the first noise detection signal $S_{D1}$ to an OB value adder 33. In response to the L level determination signal J1, the selector SEL1 provides the OB value adder 33 with a tentative average value TAVE from a tentative average value memory 36.

The OB value adder 33 accumulates the pixel values (OB value) of the first noise detection signal $S_{D1}$ provided from the selector SEL1 and the output (tentative average value TAVE) of the tentative average value memory 36 for each color to provide the cumulative value to the OB value average calculator 34. The OB value average calculator 34 calculates, for every $2^n$ pixels, the tentative average value TAVE of the OB values for each color based on the cumulative value. The OB value average calculator 34 calculates the tentative average value TAVE in response to a control signal from an OB pixel counter 35. The OB pixel counter 35 counts $2^n$ pixels and provides the control signal to the OB value average calculator 34 when the count value reaches $2^n$. The count value of the OB pixel counter 35 is incremented when an OB value or tentative average value TAVE is provided to the adder 33 from the selector SEL1.

The OB value average calculator 34 stores the tentative average value TAVE for each color for every the output of $2^n$ of the OB pixel counter 35 in a tentative average value memory 36. Then, the tentative average value TAVE stored in the memory 36 is provided to the selector SEL1. As previously described, when the L level determination signal J1 is provided from the determiner 31 to the selector SEL1, the tentative average value TAVE instead of the first noise detection signal $S_{D1}$ is provided to the OB value adder 33. Normally, to calculate the average value, non-defective pixels of all pixels are accumulated and the cumulative value is divided by the number of non-defective pixels. In comparison, the image processing circuit 20 of the preferred embodiment uses the tentative average value TAVE instead of the first noise detection signal $S_{D1}$. As a result, the total number of additions performed by the OB value adder 33 does not change regardless of whether or not there are defective pixels in the first noise detection signal $S_{D1}$. That is, the OB value adder 33 uses the tentative average value TAVE rather than the first noise detection signal $S_{D1}$ output from defective pixels. Therefore, the total number of additions performed by the OB value adder 33 is set to be constant at $2^n$. More specifically, if the determiner 31 determines that the first noise detection signal $S_{D1}$ is output from a defective pixel when the total number of additions is $2^n$, the first noise detection signal $S_{D1}$ is not added. However, even in such a case, the tentative average value TAVE is provided to the OB value adder 33. Thus, the total number of additions becomes $2^n$. As a result, the division performed when obtaining the average value AVE is easily accomplished by a bit shift. This facilitates the circuitry structure of the OB value average calculator 34.

The average value memory 37 provides a selector SEL2 with the average value AVE for each color obtained by the OB value average calculator 34. The selector SEL2 is also provided with a selection signal SMOBSL and calculated values V0, V1, V2, and V3, which are stored in a register R1. The selector SEL2 provides a column average calculator 32 with the average value AVE in response to a selection signal SMOBSL having an H level and provides the column average calculator 32 with the calculated values V0, V1, V2, and V3 in response to a selection signal SMOBSL having an L level. The calculated values V0, V1, V2, and V3 include average values of pixels calculated previously for the region (that is, the pixel average value detection region 15a) used for calculating average value AVE and average values of pixels previously calculated for other regions (for example, the second vertical OB region 16).

The column average calculator 32 obtains a second noise detection signal $S_{D2}$ from the column average value detection region 15b, which has a plurality of horizontal lines, and accumulates the OB values of a plurality of horizontal lines separate for each column and color. The cumulative OB value is stored in a correction table Tb, fed back to the column average calculator 32, and used for calculation of the next horizontal line. Then, the column average calculator 32 calculates the correction value C corresponding to each of the red (R), green (G), blue (B) colors in the final horizontal line separately for each column in accordance with the equation shown below and stores the correction value C in the correction table Tb in correspondence with the horizontal position of the pixel.

correction value C=addition result of OB values for each column and color/number of horizontal lines−average value AVE (or calculation values V0, V1, V2, and V3) for each color The correction table Tb provides the correction processing circuit 40 with the correction value C corresponding to the horizontal position of the input pixel.

Figure 5:
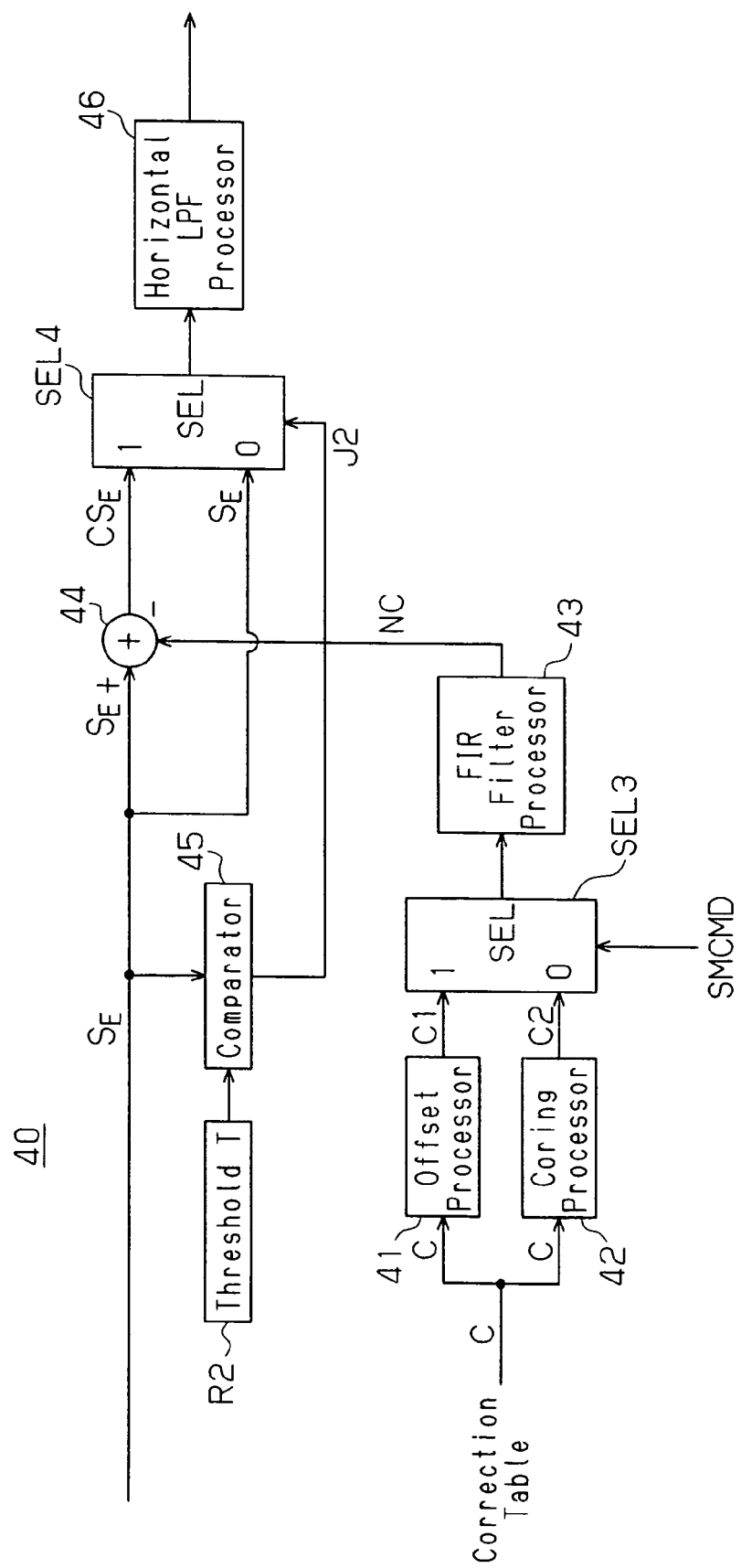
FIG. 5 is a schematic block diagram of a correction processing circuit of FIG. 2.

The correction processing circuit 40 will now be described with reference to FIG. 5.

The correction value C is supplied from the correction table Tb of the detection processing circuit 30 to an offset processor 41 and a coring processor 42 for the correction processing circuit 40. The offset processor 41 subtracts a subtraction value set beforehand from the correction value C when the correction value C is positive to generate a correction value C1 and adds an addition value set beforehand to the correction value C when the correction value C is negative to generate a correction value C1. The offset processor 41 converts the correction value C1 to [0] (first predetermined value) when the sign of the generated correction value C1 is inverted from the sign of the correction value C (that is, positive to negative, or negative to positive). As a result, the level of the saturated correction value C is reduced, and correction of a saturated smear in the CCD image sensor suppresses the generation of dark vertical streaks. It is preferred that a noise correction signal for correcting a smear be as smooth as possible at locations free from smears. Therefore, optimum smear correction is realized by converting a correction value C having a relatively small absolute value to [0].

The coring processor 42 converts the correction value C to a correction value C2 of [0] (second predetermined value) when the correction value C is between a first set value having a positive value and a second set value having a negative value. The conversion is performed as a coring process. The coring process is not performed (that is, the correction value C is generated as the correction value C2) when the correction value C is greater than the first set value or smaller than the second set value. In the coring process, a correction value C having a relatively small absolute value is converted to [0] in the same manner as in the offset process. However, the level for the correction value C of a relatively large absolute value is not reduced. Therefore, for example, fixed pattern noise of vertical streaks resulting from variations in the manufacturing process of the amplifier in the CMOS image sensor is corrected. Such noise is effectively eliminated even when image data generated by the CMOS image sensor (solid state imaging element) contains vertical streak noise.

The correction values C1 and C2 respectively generated by the offset processor 41 and coring processor 42 are provided to a selector (second selection circuit) SEL3. The selector SEL3 provides the offset-processed correction value C1 to a finite length impulse response (FIR) filter processor 43 in response to a selection signal SMCMD having an H level and provides the coring-processed correction value C2 to the FIR filter processor 43 in response to a selection signal SMCMD having an L level. The logic level for the selection signal SMCMD is determined in accordance with the type of image sensor connected to the image processing circuit 20. For example, the H level selection signal SMCMD is provided to the selector SEL3 when the solid state imaging element 10 is formed by a CCD image sensor, and the L level selection signal SMCMD is provided to the selector SEL3 when the solid state imaging element 10 is formed by a CMOS image sensor.

The FIR filter processor 43 performs the FIR filter process on the correction values C1 and C2 to generate a noise correction signal NC. Thus, noise components of the correction value are eliminated, and steep steps in the correction value in the horizontal direction are reduced. Then, the FIR filter processor 43 provides the noise correction signal NC to the calculator 44. The filter coefficient of the FIR filter processor 43 is changed to obtain the desired frequency characteristics and improve the correction accuracy.

The effective image signal $S_E$ provided from the effective pixel region 13 to the correction processing circuit 40 via the image signal generator 18 is provided to the calculator 44, a comparator 45, and a selector (first selection circuit) SEL4. The calculator 44 subtracts the noise correction signal NC from the effective image signal $S_E$ and generates an effective image signal $CS_E$ with reduced noise components. Then, the calculator 44 provides the effective image signal $CS_E$ to the selector SL4. A noise correction signal NC corresponding to the column and color of the effective image signal $S_E$ is provided to the calculator 44.

The comparator 45 compares the effective image signal $S_E$ with a pixel threshold T stored in a register R2. In the preferred embodiment, the threshold T is set in the vicinity of a value taken when the effective image signal $S_E$ is saturated. The comparator 45 generates a determination signal J2 based on the comparison result of the effective image signal $S_E$ and the threshold T and provides the determination signal J2 to the selector SEL4. Further, the comparator 45 provides the selector SEL4 with the determination level J2 at an H level when the effective image signal $S_E$ is less than the threshold T and provides the selector SEL4 with the determination signal J2 at an L level when the effective image signal $S_E$ is greater than the threshold T. The selector SEL4 then provides a horizontal LPF processor 46 with an effective image signal $CS_E$ that has been corrected by the noise correction signal NC in response to the H level determination signal J2 and provides the horizontal LPF processor 46 with an uncorrected effective image signal $S_E$ to in response to the L level determination signal J2. This avoids a correction process performed with the noise correction signal NC in the saturated smear generating region. Accordingly, the generation of dark vertical streaks caused by correcting a saturated smear is suppressed.

The horizontal LPF processor 46 generates output image data by performing horizontal LPF on the corrected effective image signal $CS_E$ or the effective image signal $S_E$ and provides the output image data to a display device such as a display or the like. The horizontal LPF process eliminates noise components from the effective image signal $CS_E$ that was subjected to correction processing. As a result, the output image data is smoothened in the horizontal direction.

The image processing circuit 20 of the preferred embodiment has the advantages described below.

(1) An offset process is performed on the correction values C of the correction table Tb. As a result, the level of the saturated correction value C is reduced, and the generation of dark vertical streaks caused by correcting saturated smears is suppressed.

(2) The coring process is performed on the correction values C of the correction table Tb. In the coring process, a correction value C that has a relatively small absolute value is converted to [0] in the same manner as an offset process. However, the level of the correction value C that has a relatively large absolute value is not reduced. Therefore, for example, fixed pattern noise of vertical streaks generated by variations in the manufacturing process of amplifiers in the CMOS image sensor is effectively eliminated.

(3) In the FIR filter process, either the offset-processed correction value C1 or the coring-processed correction value C2 is used. This increases the types of solid state imaging elements (image sensors) that may be connected to the image processing circuit 20. More specifically, in addition to a solid state imaging element formed by a CCD image sensor, a solid state imaging element formed by a CMOS image sensor may be connected to the image processing circuit 20.

(4) The FIR filter process is performed on either the offset-processed correction value C1 or the coring-processed correction value C2. Thus, random noise components are eliminated from the correction values C1 and C2. As a result, steep steps in the horizontal direction of the correction values C1 and C2 is reduced. Furthermore, the filter coefficient of the FIR filter process may be changed to realize the desired frequency characteristics and improve the correction accuracy.

(5) The comparator 45 compares the effective image signal $S_E$ with the threshold T, which is set beforehand, and determines whether or not to correct the effective image signal $S_E$ based on the comparison result. The threshold T is set in the vicinity of a value taken when the effective image signal $S_E$ is saturated. Thus, a correction process in the region that generates a saturated smear is not performed, and the generation of dark vertical streaks caused when correcting a saturated smear is optimally suppressed by a simple circuit configuration.

(6) The horizontal LPF filter process is performed on a corrected effective image signal $CS_E$ or an effective image signal $S_E$ selected by the selector SEL4. This eliminates noise components from the corrected effective image signal $CS_E$ and flattens the resulting output image data in the horizontal direction.

(7) The correction value C is generated for each color. Thus, a highly accurate correction is performed on the effective image signal SE.

(8) The column average calculator 32 is selected by the average value AVE calculated by the OB value average calculator 34 or the average value obtained from the calculation values V0, V1, V2, or V3 set in the register R1. Thus, an average value (correction value C) is calculated separately for each column or color with a highly accurate value. As a result, the effective image signal $S_E$ undergoes highly accurate correction.

It should be apparent to those skilled in the art that the present invention may be embodied in many other specific forms without departing from the spirit or scope of the invention. Particularly, it should be understood that the present invention may be embodied in the following forms.

The selector SEL1 and the tentative average value memory 36 of the detection processing circuit 30 may be omitted. That is, when a first noise detection signal $S_{D1}$ output from a defective pixel is not provided to the OB value adder 33, the counter value of the OB pixel counter 35 may be used to perform a division instead of using the present tentative average value TAVE for the average value calculation.

The selector SEL2 and register R1 of the detection processing circuit 30 may be omitted. That is, the value provided to the column average calculator 32 may also be the average value AVE normally calculated by the OB value average calculator 34.

The determiner 31 of the detection processing circuit 30 also may be omitted.

The correction value C need not be generated for each color and may be generated for RGB as a whole.

The horizontal LPF processor 46 of the correction processing circuit 40 may be omitted. That is, the signal selected by the selector SEL4 may directly be provided as output image data to a display device such as a display or the like.

In the coring process, certain correction values C between the first set value and the second set value may be converted to a predetermined value other than [0] (for example, [1]).

The selector SEL3 and the coring processor 42 of the correction processing circuit 40 may be omitted. That is, an offset process may normally be performed on the correction value C of the correction table Tb.

The FIR filter processor 43 of the correction processing circuit 40 may be omitted.

The selector SEL4, register R2, and comparator 45 may be omitted from the correction processing circuit 40. That is, correction may normally be performed on the effective image signal $S_E$ with the noise correction signal NC.

In the offset process, the correction value C may be converted to a predetermined value other than [0] (for example, [1]) when the sign of the correction value C is inverted through calculations using a subtraction value and addition value. The conversion process may also be omitted.

The noise correction method is not limited to the method of subtracting the noise correction signal NC from the effective image signal SE. The calculator 44 may perform noise correction on the effective image signal $S_E$ using at least the noise correction signal NC.

The present examples and embodiments are to be considered as illustrative and not restrictive, and the invention is not to be limited to the details given herein, but may be modified within the scope and equivalence of the appended claims.

What is claimed is:

1. A method for performing noise correction using a pixel having a predetermined pixel value and arranged in an imaging region and a pixel having a predetermined pixel value and arranged in a non-imaging region, the method comprising:
   generating, by an image processing circuit, a first noise correction value based on the pixel value of the non-imaging region;
   determining a sign of the first noise correction value by the image processing circuit;
   generating, by the image processing circuit, a second noise correction value by subtracting a predetermined subtraction value from the first noise correction value when the sign of the first noise correction value is positive;
   generating, by the image processing circuit, the second noise correction value by adding a predetermined addition value to the first noise correction value when the sign of the first noise correction value is negative; and
   correcting, by the image processing circuit, the pixel value of the imaging region based on the second noise correction value.

2. The method according to claim 1, further comprising:
   determining, by the image processing circuit, a sign of the second noise correction value; and
   converting, by the image processing circuit, the second noise correction value to a predetermined value when the sign of the second noise correction value differs from the sign of the first noise correction value.

3. The method according to claim 1, further comprising:
   comparing, by the image processing circuit, the pixel value of the imaging region with a predetermined threshold; and
   suspending, by the image processing circuit, the correction of the pixel value of the imaging region when the pixel value of the imaging region is greater than the threshold.

4. The method according to claim 1, further comprising:
   performing, by the image processing circuit, a finite length impulse response filter process on the second noise correction value.

5. The method according to claim 1, further comprising:
   converting, by the image processing circuit, the first noise correction value to a third noise correction value when the first noise correction value is between a predetermined positive value and a predetermined negative value; and
   selecting, by the image processing circuit, either one of the second noise correction value and the third noise correction value.

6. The method according to claim 1, further comprising:
   performing, by the image processing circuit, a horizontal low pass filter process on the pixel value corrected based on the second noise correction value.

7. The method according to claim 1, wherein:
   the imaging region and the non-imaging region each include a plurality of pixels corresponding to a plurality of colors; and
   said generating a first noise correction value includes calculating the first noise correction value for each of the colors by the image processing circuit.

8. The method according to claim 1, wherein:
   the non-imaging region includes:
      a plurality of first pixels; and
      a plurality of second pixels; and
   said generating a first noise correction value includes:
      calculating a first average value for pixel values of the plurality of first pixels by the image processing circuit;
      calculating a second average value for pixels values of the plurality of second pixels by the image processing circuit; and
      calculating, by the image processing circuit, the first noise correction value by subtracting the first average value from the second average value.

9. The method according to claim 8, wherein said generating a first noise correction value further includes:
   selecting, by the image processing circuit, either one of the first average value and a predetermined average value; and
   calculating, by the image processing circuit, the first noise correction value by subtracting the predetermined average value from the second average value.

10. The method according to claim 8, wherein:
   the plurality of first pixels each have an individual first pixel value; and
   said calculating a first average value includes:
      determining, by the image processing circuit, whether or not the first pixel value of each of the plurality of first pixels is included in a predetermined range;
      dividing, by the image processing circuit, the plurality of first pixels into a series of a predetermined number of pixels and calculating, by the image processing circuit, a tentative average value for the pixel values for each predetermined number of the plurality of first pixels;

updating, by the image processing circuit, the tentative average value whenever the tentative average value is calculated;

selecting, by the image processing circuit, the first pixel value when the first pixel value is included in the predetermined range;

selecting, by the image processing circuit, the updated tentative average value when the first pixel value is excluded from the predetermined range; and setting, by the image processing circuit, the first average value with the updated tentative average value; and said calculating a tentative average value includes:

accumulating, by the image processing circuit, the first pixel value or the updated tentative average value based on whether or not the first pixel value is included in the predetermined range.

11. An image processing circuit for connection to a solid state imaging device including an imaging region and a non-imaging region, the imaging region and the non-imaging region each including a pixel having a predetermined pixel value, the image processing circuit comprising:

a detection processing circuit, connected to the solid state imaging device, for generating a first noise correction value based on the pixel value of the non-imaging region;

a correction processing circuit, connected to the solid state imaging device and the detection processing circuit, for receiving the first noise correction value and for correcting the pixel value of the imaging region, wherein the correction processing circuit includes:

an offset processor, connected to the detection processing circuit, for determining a sign of the first noise correction value, for generating a second noise correction value by subtracting a predetermined subtraction value from the first noise correction value when the sign of the first noise correction value is positive and for generating the second noise correction value by adding a predetermined addition value to the first noise correction value when the sign of the first noise correction value is negative; and a calculator, connected to the solid state imaging device and the offset processor, for correcting the pixel value of the imaging region based on the second noise correction value.

12. The image processing circuit according to claim 11, wherein the offset processor determines a sign of the second noise correction value and converts the second noise correction value to a predetermined value when the sign of the second noise correction value differs from the sign of the first noise correction value.

13. The image processing circuit according to claim 11, wherein the correction processing circuit further includes:

a comparator, connected to the solid state imaging device, for comparing the pixel value of the imaging region with a predetermined threshold; and a first selection circuit, connected to the solid state imaging device, the calculator, and the comparator, for selecting the pixel value of the imaging region when the pixel value of the imaging region is greater than the threshold and for selecting the pixel value corrected by the calculator when the pixel value of the imaging region is less than the threshold.

14. The image processing circuit according to claim 11, wherein the correction processing circuit further includes:

a finite length impulse response (FIR) filter processor, connected to the offset processor and the calculator, for performing the FIR filter process on the second noise correction value.

15. The image processing circuit according to claim 11, wherein the correction processing circuit further includes:

a coring processor, connected to the detection processing circuit, for converting the first noise correction value to a third noise correction value when the first noise correction value is between a predetermined positive value and a predetermined negative value; and a second selection circuit, connected to the offset processor, the coring processor, and the calculator, for providing the calculator with either one of the second noise correction value and the third noise correction value.

16. The image processing circuit according to claim 11, wherein the correction processing circuit further includes:

a horizontal low pass filter (LPF) processor, connected to the calculator, for performing a horizontal LPF process on the pixel value corrected based on the second noise correction value.

17. The image processing circuit according to claim 11, wherein:

the imaging region and the non-imaging region each include a plurality of pixels corresponding to a plurality of colors; and the detection processing circuit calculates the first noise correction value for each of the colors.

18. The image processing circuit according to claim 11, wherein:

the non-imaging region includes:

a plurality of first pixels; and a plurality of second pixels; and the detection processing circuit includes:

a first calculator, connected to the solid state imaging device, for calculating a first average value for pixel values of the plurality of first pixels; and a second calculator, connected to the solid state imaging device and the first calculator, for calculating a second average value for pixels values of the plurality of second pixels and for generating the first noise correction value by subtracting the first average value from the second average value.

19. The image processing circuit according to claim 18, wherein the detection processing circuit further includes:

a register for storing a predetermined average value; and a third selection circuit, connected to the first calculator, the second calculator, and the register, for providing the second calculator with either one of the first average value and the predetermined average value.

20. The image processing circuit according to claim 18, wherein:

the plurality of first pixels each have an individual first pixel value;

the plurality of first pixels are divided into a series of a predetermined number of pixels and the first calculator calculates a tentative average value of the pixel values for each predetermined number of the plurality of first pixels and updates the tentative average value whenever the tentative average value is calculated; and the detection processing circuit further includes:

a determiner, connected to the solid state imaging device, for determining whether or not the first pixel value of each of the plurality of first pixels is included in a predetermined range;

a memory, connected to the first calculator, for storing the tentative average value updated by the first calculator; and a fourth selection circuit, connected to the solid state imaging device, the determiner, the memory, and the first calculator, for providing the first calculator with the first pixel value when the first pixel value is included in the predetermined range and for providing the first calculator with the tentative average value stored in the memory when the first pixel value is excluded from the predetermined range.

* * * * *